May 21, 1957     A. A. RUE     2,793,066
CHOKER LINKS

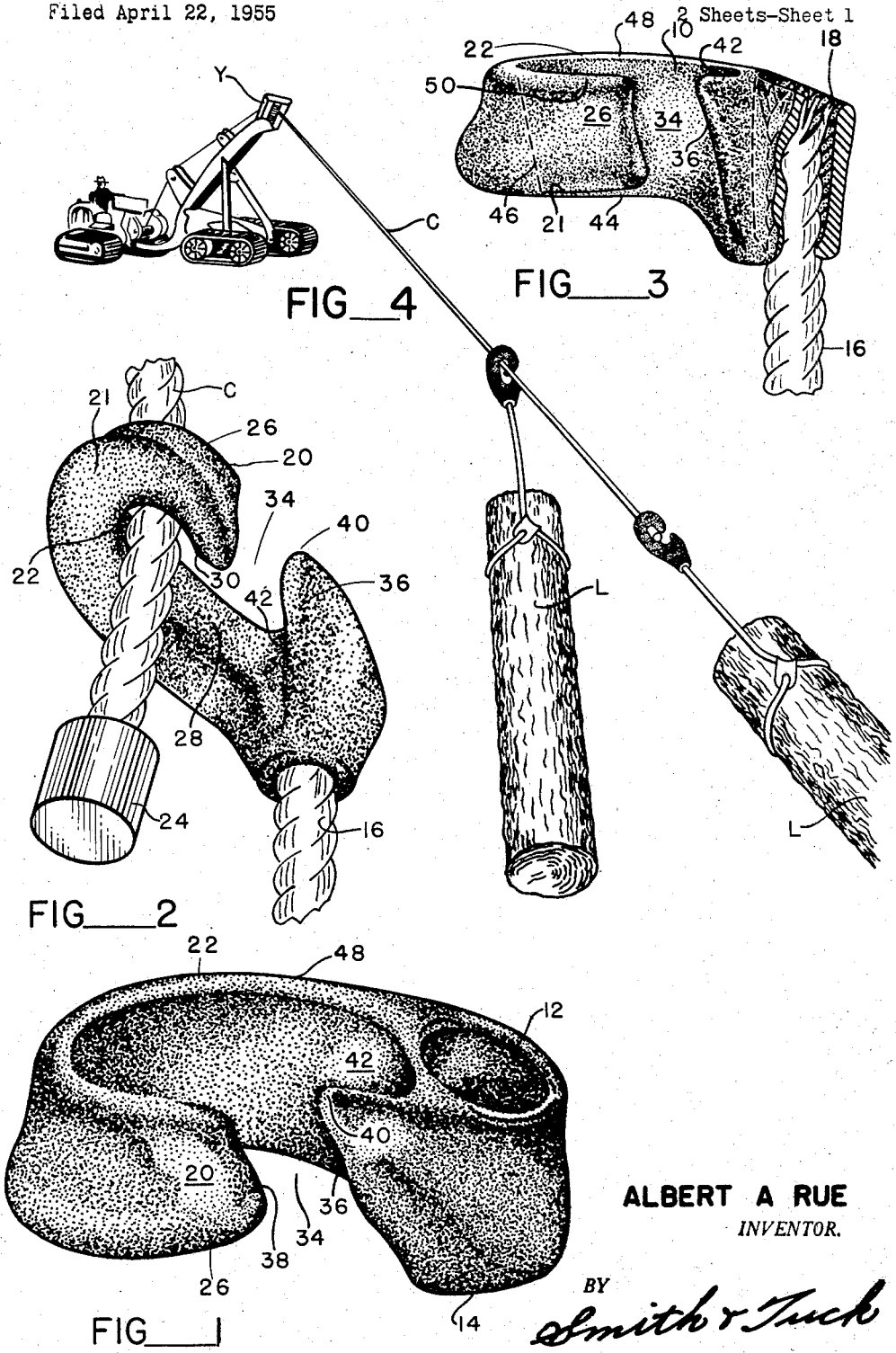

Filed April 22, 1955     2 Sheets-Sheet 2

INVENTOR.
ALBERT A RUE
BY
Smith & Tuck

# United States Patent Office 2,793,066
Patented May 21, 1957

2,793,066

CHOKER LINKS

Albert A. Rue, Santa Cruz, Calif.

Application April 22, 1955, Serial No. 503,309

7 Claims. (Cl. 294—74)

This present invention contemplates the provision of means whereby a large number of spaced logs may be successively secured in towing position to a hauling line without any pre-arranged grouping of the chokers with respect to the main or hauling line. This present choker link is secured to one end of a choker cable, preferably by babbitting the sprayed-out end of the cable into a conical opening within the link. The link itself is, in effect, a towing hook which attaches the choker to the main line from the tractor or other power means employed.

This present invention has certain characteristics in common with U. S. Patent No. 2,637,591. It differs from this former construction, however, in that the link may be attached to the main line at will, because the link merely hooks onto the most convenient portion of the main line. In the former application in which this inventor shared, the bulb end of the towing cable had of necessity to be passed through the closed end of the link. Thus, the number of chokers to be used had to be pre-determined, or it was necessary to stop the logs in movement, slack off on the main line and manually retract a portion of this heavy cable back through the already secured links, so that the bulb end of the cable could be passed through the old form of link for attachment of the new choker.

While this construction was a marked saving over that previously used, this new form of hook-on link has many outstanding advantages which aid in overall efficiency. With my new form of link, additional chokers with their attached logs can be hooked onto the main draft line without any additional man-handling, and in many cases without any necessity for stopping the movement of the main line, which in turn, of course, would cause the stoppage of the logs and the tractor in order to achieve this. A further advantage resides in this present link in that additional logs may thus be secured easily to the main line up to the limit of the power actuating the main line. This latter consideration is of considerable importance when it is remembered that even the large caterpillar tractors in current use reach their limit in dealing with a plurality of large logs.

The principal object of my present invention therefore is to provide a new form of choker link which will greatly facilitate the handling of logs in the woods, particularly when tractor equipment is used as the prime mover for the main line.

A further object of this invention is to provide a choker link in which a plurality of chokers each secured to a log may in turn be attached to the main line without in any way interfering with the logs previously attached to that line, and in some instances it is convenient to attach the choker link while the main line is still in movement but the towed-in logs have not yet reached the point where the new link is secured.

With the present construction a very convenient arrangement is made for the attachment of chokers to a main line which eliminates much of the personnel danger in handling of the older equipment and which further eliminates all of the difficult, time-consuming splicing so common in the past.

A further object of this present invention is to provide the maximum usable length of a choker without wastage of the cable, such as resulted from the older forms in which the splicing was resorted to in order to form an attachment link, which in turn attached the choker to the hook at the end of the main line. By eliminating the hook on the end of the main line and substituting for it merely an ordinary knob, it is now possible to put onto a single line in draft position any number of chokers which the prime mover can handle.

A further object of this invention is to provide a choker link so proportioned that when under draft no twisting strains are put on the cables employed to the extent that there is any apparent deformation of the cables.

Further objects, advantages and capabilities will be apparent from the description and disclosure in the drawings, or may be comprehended or are inherent in the device.

In the drawings:

Figure 1 is a perspective view illustrating my new choker link;

Figure 2 is a perspective view showing the manner in which my new link is secured to a knob-ended main line cable;

Figure 3 is a side elevation of my new link with parts of the same broken away and shown in section, in part, to better illustrate the manner in which the choker cable is secured in place;

Figure 4 is a diagrammatic view showing the manner in which my choker links are employed;

Figure 5:
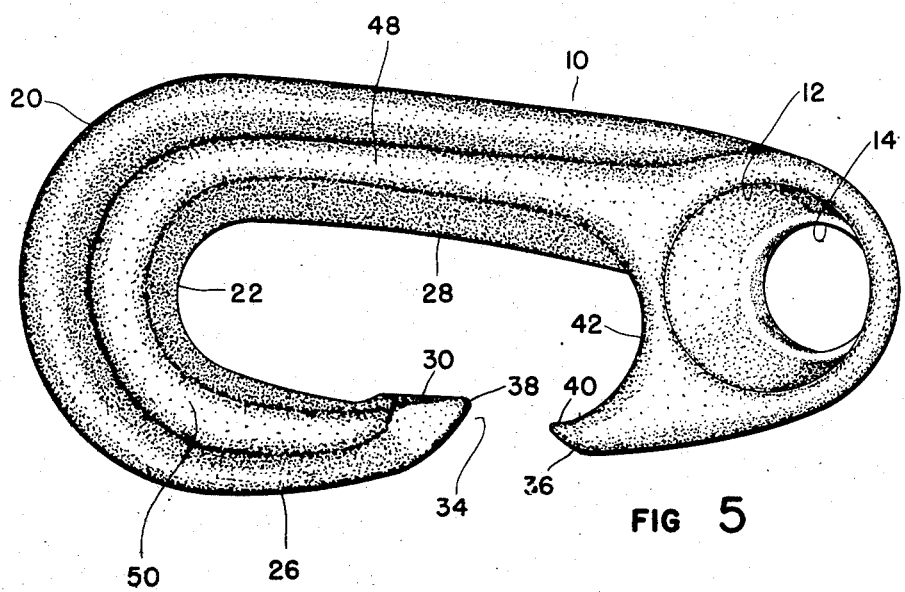
Figure 5 is an enlarged plan view of the link.

Referring more particularly to the disclosure in the drawings, the numeral 10 designates the main body of my link. It has been found best to cast this unit, as only in that way can the exact curves and configurations be achieved practically. Further, when made as a casting, the hard, tough manganese steel can be employed of a hardness which would make machining most difficult. Experience has shown that, due to the extreme and very rugged conditions under which this equipment is used, it must be made of a material that will stand almost unlimited abuse, particularly if it is going to be made reasonably light in weight. In the past, the logging equipment required for moving the heavier logs has always been very heavy and difficult to handle as it must be man-handled usually by one man, due to the rough terrain, under-brush and down timber, and the like that is encountered. My choker link adapts itself to the fabrication of light weight units and this is one of the outstanding advantages of this equipment.

At one end an enclosed conical opening is provided, having the larger end uppermost, as is shown in the various views, as at 12, and tapering down to a size at the lower portion 14, which will just readily admit the cable 16 of which the choker itself is made. The preferred manner of securing the cable 16 in the tapering socket is by means of spaying out the ends of the cable and turning some of them back upon themselves, as is illustrated at 18. The ends of the wires forming the cables are arranged so that they are flush with the body 10 and then the whole socket is poured full of a high grade babbitt, after the manner in which such connections are habitually made at the ends of cables.

As best shown in Figure 5, the axis of the conical opening is out of normal with the longitudinal axis of the body, e. g., the centers of upper and lower ends 12, 14 are offset. This means that choker cable 16 when pulled under a load will have less bend adjacent end 14 than otherwise would be the case, i. e., in Figure 2 main draft cable C is generally parallel to choker cable 16. In the link shown in the drawings, the axis of the conical opening is about ten degrees from normal to the longitudinal axis of the body, which is preferred, and the deviation should not exceed the limits of five to fifteen degrees in order to function to relieve the bend in cable 16.

Figure 7:
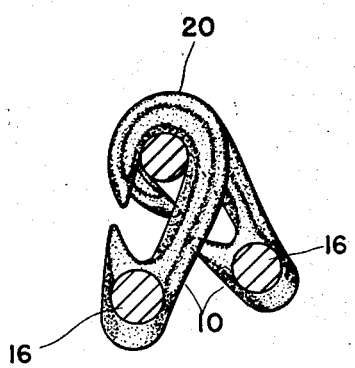
Figure 7 is a sectional view showing a plurality of nested links.
Figure 6:
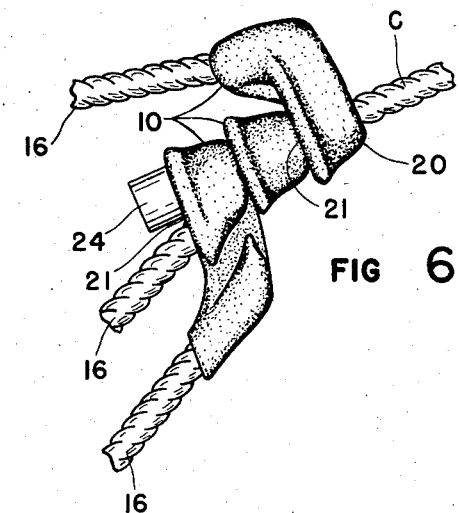
Figure 6 is a fragmentary side view showing a plurality of nested links on a main draft cable.

At its opposite end body 10 is provided with a hook portion 20. This hook portion is provided with a partially circular seat at 22, which is substantially larger than the cable C with which it is to be used. This permits the cable to come to a non-binding bearing in accordance with the conditions under which it is used, whether it is the one hook which abuts knob 24 or whether it is resting upon two, three or more other hooks that have already been placed upon the lines, as illustrated in Figures 6 and 7.

In order to prevent the hook from disengaging too easily from cable C, there is a portion at the end of the overlying hook, as 26, which is parallel to the flat inner surface of the body, as 28. In this way an abutment is provided at 30, which tends to arrest any attempts of cable C to slide out of the hook as might occur when the load has been stopped or some slack has been gained and then the tractor starts up again.

The opening 34 into the hook portion is made just slightly over the size of cable C, and to further make it more unlikely for the hook to disengage from cable C the hook tip 26 is provided with a profiled outline which is probably best shown in Figure 3. Corresponding to this is an abutment portion 36 extending out from the socket end of body 10. This abutment is profiled complementary to the end that while the spacing between the two contoured surfaces, as the outward portion 38 of hook tip 26 and the contoured outermost extent of the abutment 36, will always be slightly greater than the diameter of cable C, nevertheless, by the curve provided, the hook cannot be placed flatly on the cable, but rather must be passed on it by a sweep of the workman's hand, as though he were threading a curved opening onto a straight bar, which the cable, of course, becomes when under strain.

It should be noted that the abutment 36 has an inwardly disposed upper corner, as 40, and this in turn provides a large cable pocket as at 42, so that under conditions of varying tensions or slack occurring in the line, the cable will be more apt to find lodgment in the seat 42 than it will to find lodgment in the opening 34, and thus have a tendency to work its way out of engagement with the hook. These considerations which guard against the unhooking of this device are very important as they overcome the previous objections to a hook engaging the main line cable C. Long and trying test periods of this construction have confirmed these findings.

It is desirous to point out that the lower surface 21 of hook portion 26 and the lower portion of the body indicated at 44 should form a plane so that when the hook engages the cylindrical knob 24, it will find solid engagement so that when under load the lateral extent of the length, as viewed in Figure 3, will not sag very much below what would be normal to the line of draft provided by cable C. The degree of this divergence is generally indicated by the dotted line indicating the inner wall 46 of the hook recess 22.

When compared with the true longitudinal axis of link 10, inner wall 46 will approximate ten degrees from normal and this should be compared with the axis of the conical opening defined by the centers of the ends thereof 12, 14. The same reasoning applies to both, e. g., avoidance of bends in the cables, and wall 46 should not deviate more than five degrees from the preferred angle in order to minimize the bend in cable C.

It is to be noted that the upper surface of body 10, as viewed at Figures 1 and 3, is upwardly curved as at 48, and the hook portion's upper surface, indicated at 50, is below this level. This is to provide that as additional links are placed one on top of the other along cables C, they will come to rest with the new hook closing the opening 34 of the previous link. It is therefore desirable that an initial angular placement be provided so that all of the various hooks or links will rise substantially with the same angular relationship to cable C. It is following out this same desirable structure that surface 44, or the under surface 21 of the hook portion, has appreciable width and is substantially flat except for a necessary curving at the outer margin. This is to insure that the accumulation of variance between the cable C and the cable cavity 22 will not be sufficient so that surfaces 44, 21 will not come to a solid abutment on surfaces 50 and 48 of the hook portion that is already on the cable toward the cable terminal knob 24. Links 10 upon force applied to cables 16 will tend to swing about from the position shown in Figure 6 to that shown in Figure 7 in which the lower opening 34 is sealed.

In using my improved choker link, it is normal for the tractor to endeavor to lay the main draft line C through the center of a group of spaced logs. By that is meant logs in their natural position where they are left after being sawed to length. Sometimes this is not practical and it becomes necessary for the choker men to pull the cable manually to such a position. A choker is then placed around the log farthest from the tractor or the source of power, if it is a centrally positioned unit, and that choker is engaged with cable C so that the link abuts knob 24. Chokers are then placed upon other logs and the main cable C may, of necessity, have to be deflected somewhat so that the choker can be engaged with the main line. It often happens, however, that after a strain has been taken on the line and the first engaged logs have been started, the tractor may swing so that the cable may then pass fairly close to one of the logs to yet be engaged. In many instances it has been found practical to engage the choker link with the cable underload and thus effect an appreciable saving in time. This is normally a relatively safe act in that the log will not be moved until the first coupled logs have come up sufficiently for their links to form an abutment on the cable for the new link just attached. Y designates a tractor and one form of yoke, mounted on its own caterpillar carriage, which is in quite common use in the woods and with which this equipment is most effective. The number of logs L that can be handled at any one time, of course, is a function of the size of the logs and the terrain upon which the operation takes place. Normally, however, in the smaller logs it is quite common to first yard up to the yoke a number of the logs. With this system it will be observed that normally it is only at the very last that all of the logs will be moving. This is very desirable because at the end of their haul-in the front ends are being raised by the height of the yoke and move very much easier. When the logs are gathered in up to the yoke, the various links are all in tight abutment with each other and the logs are then taken by the tractor to a point where they may be loaded onto trucks or the like, or otherwise disposed of.

It is believed that it will be clearly apparent from the above description and the disclosure in the drawings that the invention comprehends a novel construction of a choker link.

Having thus disclosed my invention, I claim:

1. A link on the end of a choker cable securing the same to a haul-in cable having a ferrule terminal, comprising: an elongated metal body having at a first end a boss having an upright conical opening and said choker cable having one end enlarged substantially to fit said conical opening and being secured therein, said body extending from said boss along a first side of said body and forming a return bend thereby forming a hook which terminates at the second side of said body at a point spaced from said boss thereby forming a vertically through slot open centrally to the second side of said body, the end of said hook having a profiled outline facing said boss which protrudes farther at its bottom than at its top and said boss having a profiled outline facing said end of said hook with an upper horn which protrudes farther at the top of the boss than at its bottom whereby said haul-in cable is not insertable past said hook end and said upper horn by a straight side-wise movement and must be threaded vertically or distorted in order to pass, said body having immediately inside said hook end a flat surface which is parallel to the opposite substantially straight side of said slot forming a constriction in said slot, the slot widening toward said second end immediately beyond said flat surface whereby it serves as an abutment and the slot terminating at said second end of said body in a semi-circular outline of a size to receive said haul-in cable, the slot terminating at said first end of said body in a concave portion beyond said upper horn to receive said haul-in cable at that point to deter escape through the side opening of the slot, the axis of said conical opening being offset from normal to the longitudinal axis of said body about ten degrees in a direction extending away from said slot as it extends downwardly and the wall of said slot at the second end of the body being inclined vertically in approximately the same way as the axis of said conical opening whereby bending of said haul-in and choker cables is minimized when several links are installed on the haul-in cable, and the bottom of said body in the area of said hook being substantially horizontal except the under surface of the hook end portion which slants upwardly, the boss extending therebelow and the top of said body being convex on said first side of said body and the upper surface of said hook lying below the convex surface whereby when a plurality of links is installed on said haul-in cable, later installed links tend to assume a position blocking the side openings of the slots of previously installed links when subjected to the repeated jarring and strain on tractive forces incidental to use.

2. A link on the end of a choker cable securing the same to the haul-in cable having a ferrule terminal, comprising: an elongated metal body having at a first end a boss having an upright opening and said choker cable having one end secured in said upright opening, said body extending from said boss along a first side of said body and forming a return bend thereby forming a hook which terminates at the second side of said body at a point spaced from said boss thereby forming a vertically through slot open medially to the second side of said body, the end of said hook having a profiled outline facing said boss which protrudes farther at its bottom than at its top and said boss having a profiled outline facing said end of said hook with an upper horn which protrudes farther at the top of the boss than at its bottom whereby said haul-in cable is not insertable past said hook end and said upper horn by a straight side-wise movement and must be threaded vertically or distorted in order to pass, said body having immediately inside said hook end a flat surface which is parallel to the opposite substantially straight side of said slot forming a constriction in said slot, the slot widening toward said second end immediately beyond said flat surface whereby it serves as an abutment and the slot terminating at said second end of said body in an arcuate outline of a size to receive said haul-in cable, the slot terminating at said first end of said body in a concave portion beyond said upper horn to receive said haul-in cable at that point to deter escape through the side opening of the slot, the axis of said upright opening being offset from normal to the longitudinal axis of said body between five and fifteen degrees in a direction extending away from said slot as it extends downwardly and the wall of said slot at the second end of the body being inclined vertically in approximately the same way as the axis of said upright opening whereby bending of said haul-in and choker cables is minimized when several links are installed on the haul-in cable, and the bottom of said body in the area of said hook being substantially horizontal except the under surface of the hook end portion which slants upwardly, the boss extending therebelow and the top of said body being convex on said first side of said body and the upper surface of said hook lying below the convex surface whereby when a plurality of links is installed on said haul-in cable later installed links tend to assume a position blocking the side openings of the slots of previously installed links when subjected to the repeated jarring and strain of tractive forces incidental to use.

3. A link on the end of a choker cable securing the same to the haul-in cable having a ferrule terminal, comprising: an elongated metal body having at a first end a boss having an upright opening and said choker cable having one end secured in said conical opening, said body extending from said boss along a first side of said body and forming a return bend thereby forming a hook which terminates at the second side of said body at a point spaced from said boss thereby forming a vertically through slot open medially to the second side of said body, the end of said hook having a profiled outline facing said boss which protrudes farther at its bottom than at its top and said boss having a profiled outline facing said end of said hook with an upper horn which protrudes farther at the top of the boss than at its bottom whereby said haul-in cable is not insertable past said hook end and said upper horn by a straight side-wise movement and must be threaded vertically or distorted in order to pass, said body having immediately inside said hook end a flat surface which is parallel to the opposite substantially straight side of said slot forming a constriction in said slot, the slot widening toward said second end immediately beyond said flat surface whereby it serves as an abutment and the slot terminating at said second end of said body in an arcuate outline of a size to receive said haul-in cable, the slot terminating at said first end of said body in a concave portion beyond said upper horn to receive said haul-in cable at that point to deter escape through the side opening of the slot, and the bottom of said body in the area of said slot being substantially horizontal in the area of said slot with the boss extending therebelow and the top of said body being convex on said first side of said body and the upper surface of said hook lying below the convex surface whereby when a plurality of links is installed on said haul-in cable later installed links tend to assume a position blocking the side openings of the slots of previously installed links.

4. A link on the end of a choker cable securing the same to the haul-in cable having a ferrule terminal, comprising: an elongated metal body having at a first end a boss having an upright opening and said choker cable having one end secured in said upright opening, said body extending from said boss along a first side of said body and forming a return bend thereby forming a hook which terminates at the second side of said body at a point spaced from said boss thereby forming a vertically through slot open medially to the second side of said body, the end of said hook having a profiled outline facing said boss which protrudes farther at its bottom than at its top and said boss having a profiled outline facing said end of said hook with an upper horn which protrudes farther at the top of the boss than at its bottom whereby said haul-in cable is not insertable past said hook end and said upper horn by a straight side-wise movement and must be threaded vertically or distorted in order to pass, said body having immediately inside said hook end a flat surface which is parallel to the opposite substantially straight side of said slot forming a constriction in said slot, the slot widening toward said second end immediately beyond said flat surface whereby it serves as an abutment and the slot terminating at said second end of said body in an arcuate outline of a size to receive said haul-in cable, and the bottom of said body in the area of said hook being substantially horizontal except the under surface of the hook end which slants upwardly and the top of said body being raised on said first side of said body relative the upper surface of said hook whereby when a plurality of links is installed on said haul-in cable later installed links tend to assume a position blocking the side openings of the slots of previously installed links when subjected to the repeated jarring and strain of the tractive forces incidental to use.

5. A link on the end of a choker cable securing the same to the haul-in cable having a ferrule terminal, comprising: an elongated metal body having at a first end a boss having an upright opening and said choker cable having one end secured in said upright opening, said body extending from said boss along a first side of said body and forming a return bend thereby forming a hook which terminates at the second side of said body at a point spaced from said boss thereby forming a vertically through slot open medially to the second side of said body, the end of said hook having a profiled outline facing said boss which protrudes farther at its bottom than at its top and said boss having a profiled outline facing said end of said hook with an upper horn which protrudes farther at the top of the boss than at its bottom whereby said haul-in cable is not insertable past said hook end and said upper horn by a straight side-wise movement and must be threaded vertically or distorted in order to pass, said body having immediately inside said hook end a flat surface which is parallel to the opposite substantially straight side of said slot forming a constriction in said slot, the slot widening toward said second end immediately beyond said flat surface whereby it serves as an abutment and the slot terminating at said second end of said body in an arcuate outline of a size to receive said haul-in cable, the slot terminating at said first end of said body in a concave portion beyond said upper horn to receive said haul-in cable at that point to deter escape through the side opening of the slot, the axis of said upright opening being offset from normal to the longitudinal axis of said body in a direction extending away from said slot as it extends downwardly and the wall of said slot at the second end of the body being inclined vertically in approximately the same way as the axis of said conical opening whereby bending of said haul-in and choker cables is minimized when several links are installed on the haul-in cable.

6. A link on the end of a choker cable securing the same to the haul-in cable having a ferrule terminal, comprising: an elongated metal body having at a first end a boss having an upright opening and said choker cable having one end secured in said upright opening, said body extending from said boss along a first side of said body and forming a return bend thereby forming a hook which terminates at the second side of said body at a point spaced from said boss thereby forming a vertically through slot open medially to the second side of said body, the end of said hook and said boss having profiled outlines at the side opening of said slot whereby said haul-in cable is not insertable therebetween by a straight side-wise movement and must be threaded vertically or distorted in order to pass, the axis of said upright opening being offset from normal to the longitudinal axis of said body in a direction extending away from said slot as it extends downwardly and the wall of said slot at the second end of the body being inclined vertically in approximately the same way as the axis of said upright opening whereby bending of said haul-in and choker cables is minimized when several links are installed on the haul-in cable.

7. A link on the end of a choker cable securing the same to the haul-in cable having a ferrule terminal, comprising: an elongated metal body having at a first end a boss having an upright opening and said choker cable having one end secured in said upright opening, said body extending from said boss along a first side of said body and forming a return bend thereby forming a hook which terminates at the second side of said body at a point spaced from said boss thereby forming a vertically through slot open medially to the second side of said body, the end of said hook and said boss having profiled outlines at the side opening of said slot whereby said haul-in cable is not insertable therebetween by a straight side-wise movement and must be threaded vertically or distorted in order to pass, and the bottom of said body in the area of said hook being substantially horizontal except the under surface of the hook end which slants upwardly, the boss extending therebelow and the top of said body being raised on said first side of said body relative the upper surface of said hook whereby when a plurality of links are installed on said haul-in cable later installed links tend to assume a position blocking the side openings of the slots of previously installed links when subjected to the repeated jarring and strain of the tractive forces incidental to use.

No references cited.